March 1, 1949.  J. C. HOBBS  2,463,382
LIQUID AND GAS SEPARATING APPARATUS
Filed Jan. 8, 1944  3 Sheets-Sheet 1
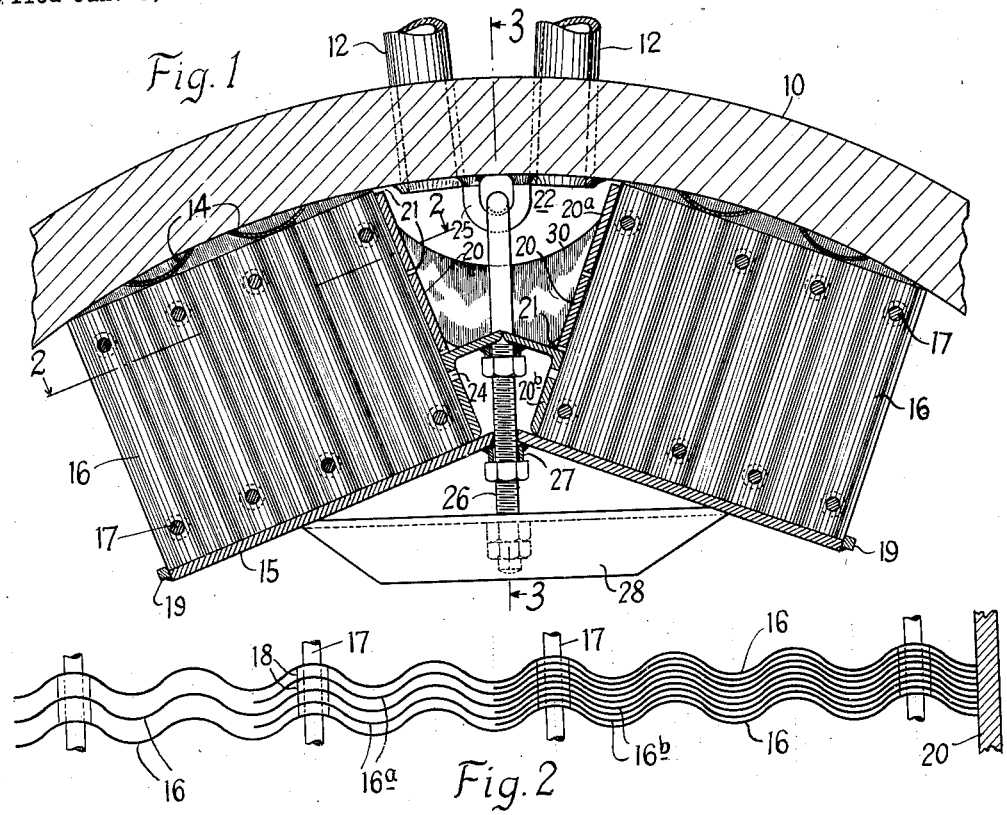
Fig. 1
Fig. 2
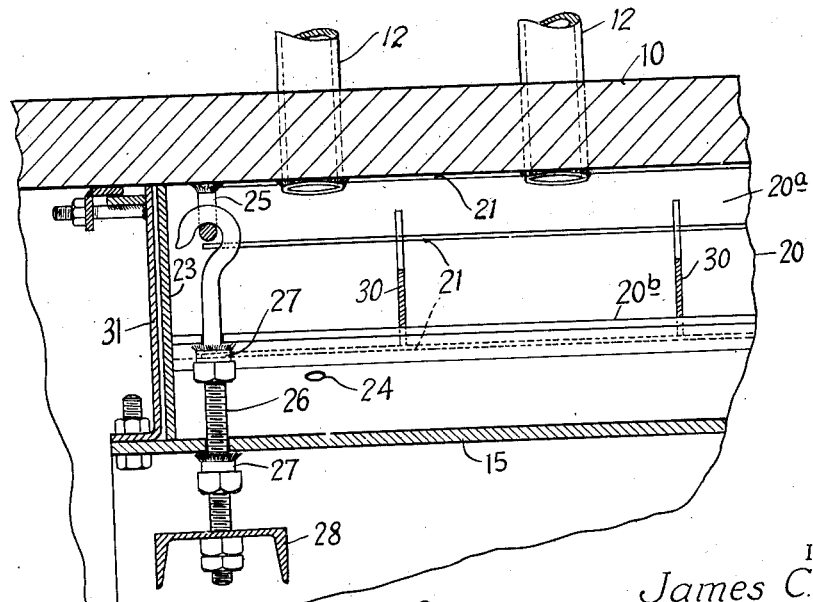
Fig. 3
INVENTOR.
James C. Hobbs
BY
Attorney March 1, 1949. J. C. HOBBS 2,463,382
LIQUID AND GAS SEPARATING APPARATUS
Filed Jan. 8, 1944 3 Sheets-Sheet 2

INVENTOR.
James C. Hobbs
BY
Attorney

March 1, 1949.  J. C. HOBBS  2,463,382
LIQUID AND GAS SEPARATING APPARATUS
Filed Jan. 8, 1944  3 Sheets-Sheet 3

INVENTOR.
James C. Hobbs
BY
ATTORNEY

Patented Mar. 1, 1949

2,463,382

UNITED STATES PATENT OFFICE 2,463,382

LIQUID AND GAS SEPARATING APPARATUS

James C. Hobbs, Painesville, Ohio

Application January 8, 1944, Serial No. 517,503

15 Claims. (Cl. 183—113)

The present invention relates in general to the construction and operation of apparatus for separating liquids from gases, and more particularly, to separating apparatus adapted for use in the steam space of a steam and water drum of a steam generating unit for the removal of suspended moisture and solids from the outgoing steam.

My present invention is particularly directed to separating apparatus of the type shown in U. S. Patents 2,007,966 and 2,058,240 in which the wet gases at a relatively low velocity are passed along and in intimate contact with a large area of liquid collecting surface in the form of a series of closely spaced continuously curved corrugated plates arranged side-by-side in a slightly nested formation to form a series of narrow shallow sinuous flow channels therebetween and with the plate corrugations arranged to facilitate the gravity discharge of separated liquid.

In steam and water separators of the character described, the wet or saturated steam enters in a series of thin parallel streams, each of which flows through the laterally undulating flow path formed by a pair of adjacent plates. Substantially all portions of the flowing streams are brought into contact with the surfaces of the plates by the slight turbulent effect on the streams due to gradual changes in direction of flow of the flow channels. The smooth shallow corrugations avoid abrupt changes in direction, yet effect sufficient turbulence to bring substantially all particles of the suspended moisture into contact with the collecting surface within the available length of the separator. The separating moisture particles tend to adhere to the wet moisture collecting plates and under the action of gravity to drain along the corrugations. The corrugated plates are preferably arranged in vertical planes with their corrugations vertically inclined at an angle corresponding to the vector resultant of the gravital and velocity forces acting on the suspended moisture particles at the designed normal operating capacity of the generating unit to minimize the intermingling of the moisture separating on adjacent corrugations.

The moisture separating efficiency of separators of the character described is largely dependent upon the amount of moisture collecting surface in the path of steam flow and a uniform distribution of the work between the various plate elements of the separator. Such distribution is disadvantageously affected by any differences in steam pressure drop along different portions of the separator length resulting in some of the flow channels being overloaded and others being underloaded. The amount of moisture collecting surface permissible is limited by the available drum space and the necessity of a plate spacing which will prevent clogging of the flow channels by solids carried in the steam or in the suspended moisture particles.

The general object of my invention is to improve the construction and operation of liquid and gas separators of the character described. Further and more specific objects are to provide a liquid and gas separator of the character described having a high ratio of liquid collecting surface to the space occupied by the separator, a uniform distribution of the separating load throughout the length of the separator, a construction having a low cost of manufacture and installation, and permitting a drum arrangement leaving a large proportion of the drum interior accessible for inspection and repairs and also the maintenance of high water levels in the drum without carryover of moisture.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 1 is a sectional elevation of a portion of a steam generator steam and water drum incorporating a plate separator constructed in accordance with my invention;

Fig. 2 is a plan section on an enlarged scale taken on the line 2—2 of Fig. 1;

Fig. 3 is a vertical section taken on the line 3—3 of Fig. 1;

Figure 4:
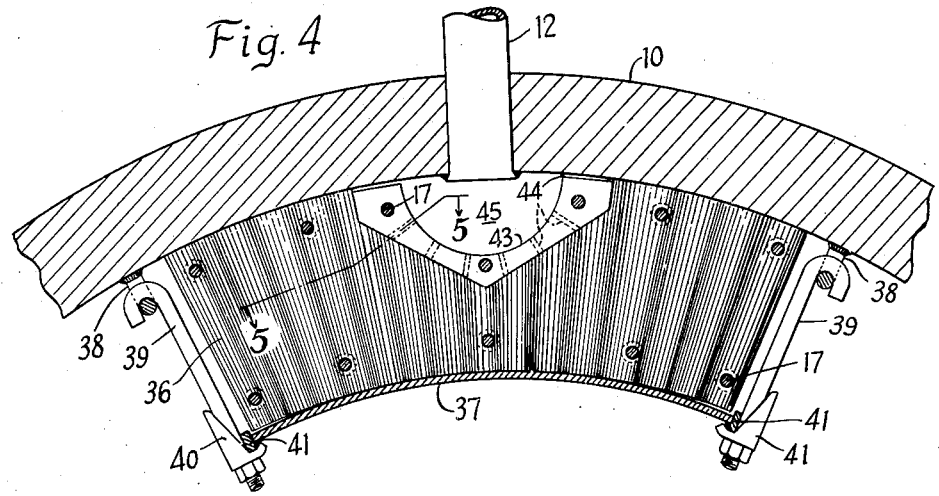
Fig. 4 is a view similar to Fig. 1 of a modified construction.
Figure 6:
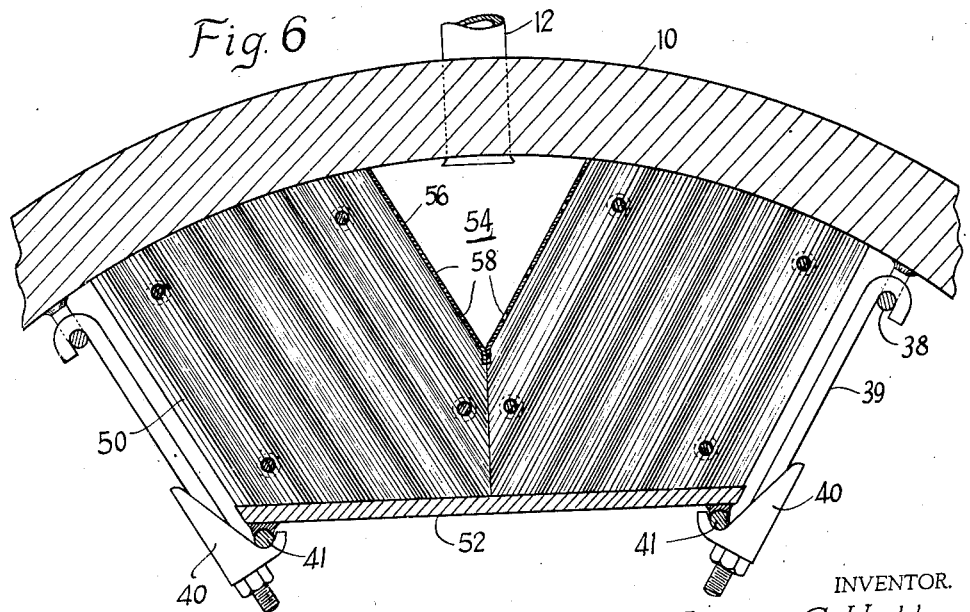
Figure 7:
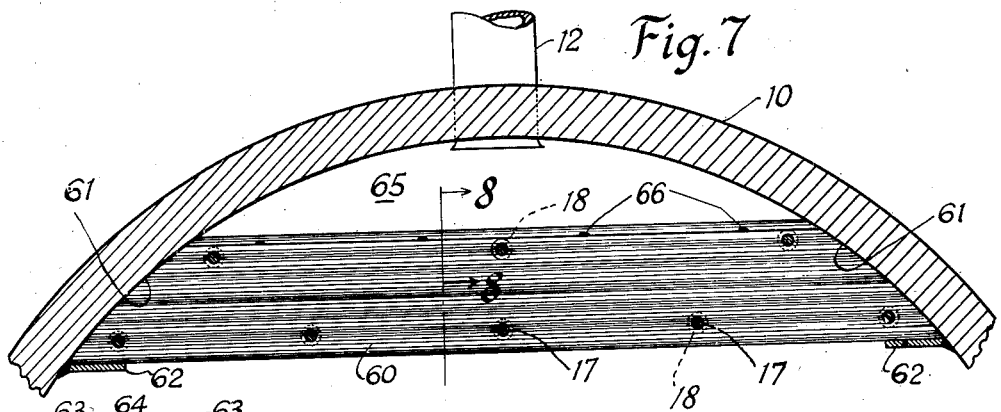
Figure 8:
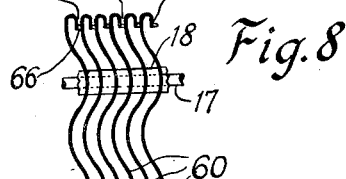

Figs. 6, 7, 9 and 10 are views similar to Figs. 1 and 4 of other modified constructions; and Fig. 8 is an enlarged fragmentary vertical section taken on the line 8—8 of Fig. 7.

In the construction illustrated in Figs. 1–3, the separator is positioned in the steam space of a horizontally arranged steam and water drum 10 of the type illustrated in said prior patents and receiving a mixture of steam and water from the generating section of the unit entering the drum 10 through steam and water circulator tubes connected to the side of the drum above the normal water level therein. The drum is also provided with the usual downcomer connections, and one or more rows of steam outlet connections 12 symmetrically arranged along the top of the drum.

The separator is made in oppositely inclined twin sections having a symmetrical arrangement at opposite sides of the steam outlets 12 and extending longitudinally of the uppermost portion of the drum 10. Each separator section is formed by an imperforate bottom plate 15 on which is mounted a series of closely spaced imperforate corrugated sheet metal plates 16, 16a, 16b, arranged side-by-side in vertical planes transversely of the drum. As shown in Figs. 1 and 2, all of the separator plates have the same width and depth of corrugation and the same height, but the plates 16, 16a, 16b are of different dimensions in the direction of gas flow. The plates 16 extend the full width of each separator section, while the plates 16a extend only about three-quarters, and the plates 16b only about one-half of the width of the section. The plates are assembled in spaced relation on rods 17 extending through corresponding openings in the plates and curved spacer members 18 between adjacent plates, the plates being relatively arranged and spacer members proportioned to provide sinuous flow channels progressively decreasing in width and increasing in number from the steam inlet to the steam outlet ends of the setting. As shown in Fig. 2, between each pair of plates 16 is positioned a plate 16a, and between each plate 16a and the adjoining plate 16 is a plate 16b, the outlet edges of all of the plates 16, 16a and 16b being in alignment. With this arrangement, each fluid stream entering a flow channel between a pair of plates 16 is subdivided on reaching the outer end of the intermediate plate 16a and each subdivision again subdivided on reaching the intermediate plates 16b. The portions of the plates 16 at the entrance end are spaced apart sufficiently to permit solids to deposit thereon without clogging the steam flow area. Much of the suspended moisture particles and solids will be eliminated in the entrance end portion of the separator. The amount of moisture collecting surface can accordingly be increased in the remaining portion of the length of the flow path with little danger of solids being deposited and clogging the flow channels.

By way of example, and not of limitation, in each separator section all of the plates may have continuously curved corrugations 1¼" in width and ¼" in depth, with the plates 16 spaced $\tfrac{7}{32}$" apart and the intervening plates 16a and 16b uniformly spaced therebetween.

The separator sections are positioned in the uppermost part of the drum with the upper corners of the corrugated plates 16 in contact with the drum wall and the corrugations of all of the plates at an angle to the vertical, preferably corresponding to the vector resultant of the velocity and gravital forces on the separated moisture to facilitate drainage downwardly along the corrugations. The plate 15 closes the bottom of the flow channels of each section, with the corrugated plates held in position thereon by a bar 19 along its outer edge. The space between the upper edge of the separator plates and the drum wall is occupied by curved seal plates 14 to prevent steam by-passing the separating surface.

Each separator section is provided with a distribution or orifice plate 20 which fits tightly against the inner edges of the separating plates 16, 16a, 16b, and upper surface of the bottom plate 15, and closes the exit end of the flow channels except for restricted steam passages in the plate 20. The steam flow area through the plates 20 is quite small, approximating the steam outlet area from the corresponding part of the drum, and preferably in the form of one or more continuous narrow slots 21 extending horizontally substantially the full length of the plate 20 at vertically spaced points. As shown in Figs. 1 and 3, three slots 21 are employed, one at the top of the plate 20, one about 25%, and the third about 50% down from the top of the plate 20. The steam outlet openings are thus confined to the zone of dryest steam flow. The slots 21 can be of the order of $\tfrac{1}{16}"-\tfrac{1}{8}"$ in depth, because the total area of all of these slots when operated with a relatively small pressure drop, such as less than 1 p. s. i., will provide the maximum steam flow capacity needed.

The relatively small steam outlet area through the distribution plate 20 and its tight contact with the separator plates insures a uniform distribution of the steam to the flow channels throughout the length of the separator and consequenly equalization of work over the separating surface, and thereby the maximum efficiency of the separator. The location of the distribution plate 20 at the outlet side of the flow channels also permits such small outlet openings to be maintained clear, whereas similar distribution means at the entrance end of the flow channels would tend to clog rapidly. The described construction also provides an extremely low pressure drop through the flow channels up to the distribution plate, which operating condition, coupled with the inclined arrangement of the bottom plate 15, facilitates flow of the separated moisture down the corrugated plates and the bottom plate into the bottom part of the drum, and thus out of the main path of steam flow through the separator.

The distribution plate 20 is shown as formed by a flat upper plate 20a and an angle 20b spaced to form the lowermost outlet slot 21 and with the corresponding legs of the angles of the two sections welded together to close the bottom of the steam outlet space 22 between the separator sections and to which the outlet pipes 12 open. The ends of this space and the plate sections are closed by end plates 23 welded to the angles 20b. Vent openings 24 are provided at spaced points in the vertical legs of the angles 20b. The separator sections are supported at spaced points longitudinally thereof by eye bolts 25 welded to the drum wall and hook bolts 26 suspended thereby and arranged to support collars 27 welded to the contacting portions of the angles 20b and bottom plates 15. The hook bolts also support transverse channels 28 which engage the bottom plates 15 to hold the separator sections against the drum wall. The steam outlet space 22 is subdivided at longitudinally spaced points by transverse web plates 30 having an upper curved edge terminating short of the top of the space 22. The bottom plates 15 are also supported by end plates 31 bolted thereto and to the drum wall. All of the parts forming the separators disclosed herein are proportioned to permit their entry through the usual manhole at one end of the drum for installation and repair.

Figure 5:
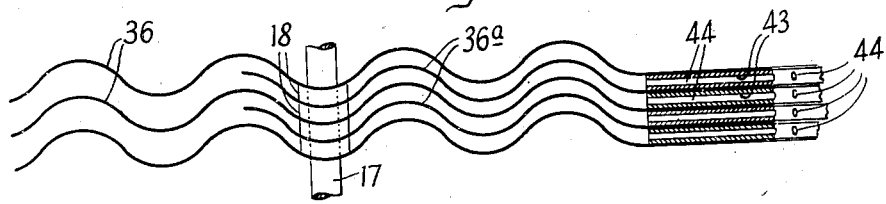
Fig. 5 is a plan section on an enlarged scale taken on the line 5—5 of Fig. 4.

The modified construction illustrated in Figs. 4 and 5 comprises fewer parts than the construction of Figs. 1–3, each of the separator corrugated plate elements being arranged to extend transversely of the drum to points at opposite sides of the steam outlets 12, with the plates 36 being of greater width than the alternately intervening plates 36ª, and relatively arranged to form sinuous steam flow channels having entrance portions of greater width at opposite sides of the separator. Each separator plate has its upper edge curved to fit the curvature of the drum wall 10 and its lower edge curved on a smaller radius, with the corrugations extending radially of the drum. A curved bottom plate 37 fits against the lower edges of the plates 36, 36ª and closes the bottom of the flow channels therebetween. The separator is supported in this position by eye bolts 38 on the drum wall carrying hook bolts 39 and support clips 40, which engage bars 41 at the outer edges of the bottom plate. The upper central portions of the plates 36 and 36ª are cut away on an arc symmetrical with the steam outlets 12 to form a central steam space 45 extending longitudinally of the drum and the portion of each flow channel opening thereto is closed by a V-shaped spacer and orifice plate 43 fitting between flattened portions of each pair of adjacent plates 36 and 36ª with its inner edge registering with the inner edges of the adjoining plates. Each of the spacer and orifice plates has a series of small orifices 44 therein connecting the corrugated plate flow channels with the central steam space 45. The orifice plates also serve as spacer members for the central part of the corrugated plates and are held in position by the rods 17 extending therethrough. The central steam space 22 is closed at its ends in any suitable manner to prevent by-passing of the separator elements. The functioning of the construction shown in Figs. 4 and 5 will be apparent from the described operation of that shown in Figs. 1–3.

In the modified construction illustrated in Fig. 6, the corrugated plates 50 are arranged in two sections with oppositely arranged vertically inclined corrugations and the inner edges of corresponding plates in contact and the bottom of all of the flow channels closed by a common flat bottom plate 52. The upper edges of all of the plates 50 are curved to fit tightly against the wall of the drum 10, as in the construction shown in Figs. 4 and 5, and similar support provisions are employed. The central steam space 54 below the steam outlets 12 is V-shaped in cross-section and closed at its opposite ends. Orifice plates 56 having orifices 58 are arranged in a V-formation in tight contact with the inner ends of the plates 50 to control the load distribution between the sinuous flow channels. With this construction, the wet steam will enter at opposite sides of the separator and flow through the sinuous flow channels and orifices 58 to the steam space 54. The separated moisture flowing down the corrugations collects on the bottom plate 52 and overflows the edges thereof to the subjacent portion of the drum.

The modified separator constructions illustrated in Figs. 7–10 provides a further reduction in weight, space requirements, and cost of construction and installation. In these constructions, the corrugated plate separator units are located in the highest portion of the steam and water drum 10, requiring no more head-room than the perforated dry pipes heretofore in use. In the construction shown in Figs. 7 and 8, the corrugated plate elements 60 have horizontally extending corrugations with the opposite ends 61 of each plate curved to conform with the curvature of the wall portions of the drum with which they are designed to contact. The plates 60 are supported in their described side-by-side spaced relation by narrow seal plates 62 extending along the bottom end portions of the plates 60 and secured to the drum wall in any suitable manner, as by welding. In lieu of an orifice plate arranged in contact with the upper edge of the plates 60, the plates may be crimped along their upper edges, as shown in Fig. 8, to form depending flanges 63 which extend downwardly adjacent the next plate. The crimped edges have spacing bosses 66 at spaced points extending into contact with the next plate. The effective flow area at the upper or discharge end of each flow channel is thus reduced to a substantially continuous narrow slit 64 extending the full length of the plates and having less than half the flow area at the lower or entrance end of the separator. The crimped edge portions also serve to structurally reinforce the corresponding plates and to form pockets along the upper edge of the plates which intercept any moisture particles which may reach that point. Under normal operating conditions, the suspended moisture particles contact with and collect on the corrugated plate surfaces as previously described and flow downwardly to the lower edges of the plate 60, from which they drop into the water space of the drum. The purified steam flows into the dry steam space 65 above the separator and then through the outlets 12 to a point of use. All of the structure except the seal plates 62 is thus utilized for separating purposes.

Figure 9:
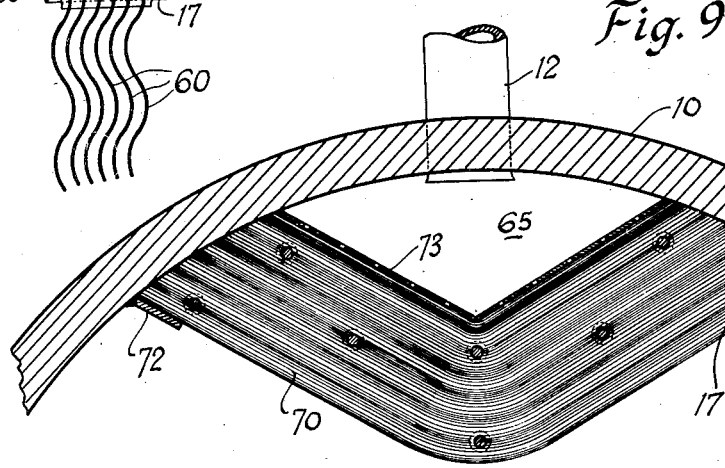

In the separator construction shown in Fig. 9, the spaced corrugated plates 70 have a shallow V-shaped form and are symmetrically arranged relative to the drum steam outlet 12. The corrugations thus have oppositely inclined portions in contact with the drum wall at opposite sides of the outlet 12. The plates are supported on edge seal plates 72 similar to those in Fig. 7. The restricted flow area at the discharge end of the narrow sinuous flow channels is provided by a correspondingly V-shaped orifice plate 73 similar in construction to the orifice plate 56 in Fig. 6, or by crimped plate upper edge portions as shown in Fig. 8.

Figure 10:
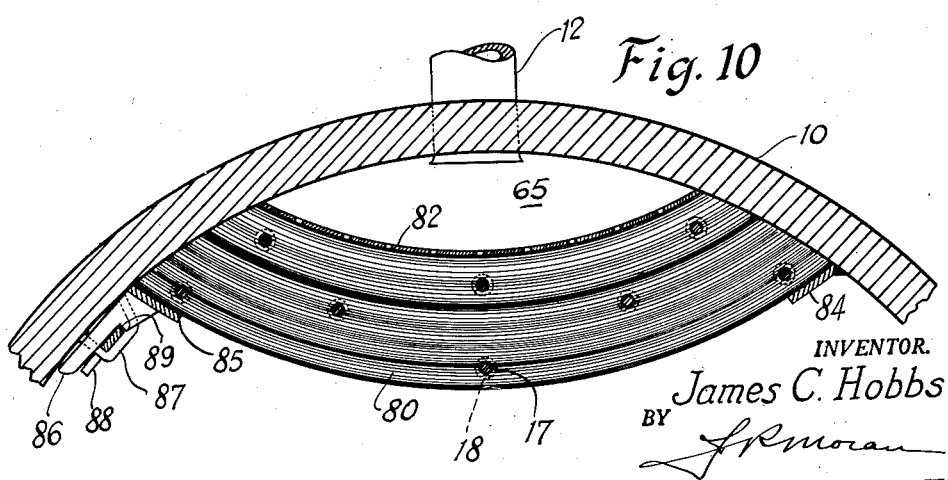

In the separator construction shown in Fig. 10, the spaced corrugated plates 80 have a continuously curved form and are symmetrically arranged relative to the drum steam outlet 12. A correspondingly curved orifice plate 82 on the upper edge of the plates provides the desired restriction at the discharge end of the sinuous flow passages, although the upper edges of the plates can be crimped as in Fig. 8 for this purpose. The curved plates are supported at one end by a seal plate 84 secured to the drum wall and at their opposite end by a seal plate 85 having depending brackets 86 at spaced points. The brackets 86 are arranged relative to U-bolts 87 on the drum wall so that a wedge member 88 may be inserted through several U-bolts and act on a shoulder 89 on the brackets 86 to force the corrugated plates 80 in position against the drum wall. The wedges 88 can be loosened, but need not be withdrawn, to allow the corresponding corrugated plate sections to drop slightly and be moved lengthwise of the drum on the plates 84 and 85 for inspection and repair.

All of the separator constructions described are characterized by their compactness and adaptability for installation in the uppermost portion of the steam space of the drum, leaving a large proportion of the drum cross-section unobstructed and thus facilitating access thereto. The provision of the separator plates of different widths not only substantially increases the effective moisture separating area for a given space, but also retains the non-clogging characteristics of prior constructions of this type. The provision of orifice or distribution plates at and in tight contact with the inner ends of the plates prevents communication between adjacent flow channels and insures a uniform distribution of the separating load throughout the separator, thereby substantially increasing the separator efficiency.

I claim:

1. Gas and liquid separating apparatus comprising a plurality of corrugated liquid separating plates arranged side-by-side in spaced relation to form narrow sinuous gas flow channels therebetween with the plate corrugations extending transversely of the general direction of gas flow in said channels, adjoining corrugated plates being relatively arranged to decrease the effective width of said flow channels towards the gas outlet end thereof, and a flow distribution plate in substantially continuous contact with the ends of said separating plates at the gas outlet end of said flow channels and having restricted openings therein for gas flow therethrough.

2. Gas and liquid separating apparatus comprising a plurality of corrugated liquid separating plates arranged side-by-side in spaced relation to form narrow sinuous gas flow channels therebetween with the plate corrugations extending transversely of the general direction of gas flow in said channels, adjoining corrugated plates being of different lengths in the direction of gas flow and relatively arranged to subdivide the gas outlet end portions of said gas flow channels, a flow distribution plate in substantially continuous contact with the ends of said separating plates at the gas outlet end of said flow channels and having restricted openings therein for gas flow therethrough from said flow channels, and a bottom plate contacting with said separating plates and arranged to close the lower side of said flow channels throughout their extent.

3. In a horizontally arranged gas and liquid drum constructed to hold a body of liquid in the lower part thereof and having a dry gas outlet in the uppermost part thereof, a gas and liquid separator comprising a plurality of corrugated liquid separating plates symmetrically arranged at opposite sides of said gas outlet in side-by-side relation to form narrow sinuous flow channels therebetween with said corrugations vertically inclined and extending transversely to the general direction of gas flow through said channels, the upper edges of said separating plates being in contact with the drum wall, flow distribution means in contact with said separating plates at the gas outlet end of said flow channels and having orifices therein for gas flow therethrough, and an imperforate plate closing the lower side of said gas flow channels throughout their extent and arranged to conduct separated liquid to the inlet end of said flow channels.

4. In a horizontally arranged gas and liquid drum constructed to hold a body of liquid in the lower part thereof and having a dry gas outlet in the uppermost part thereof, a gas and liquid separator above the body of liquid and comprising a plurality of corrugated liquid separating plates arranged in side-by-side relation to form narrow sinuous flow channels therebtween with said corrugations extending transversely to the general direction of gas flow through said flow channels, said separating plates extending continuously between spaced points on said drum wall at opposite sides of said gas outlet, and support means connected to said drum wall for holding said separator in position.

5. In a horizontally arranged gas and liquid drum constructed to hold a body of liquid in the lower part thereof and having a dry gas outlet in the uppermost part thereof, a gas and liquid separator above the body of liquid comprising a plurality of corrugated liquid separating plates symmetrically arranged relative to and in the path of gas flow to said gas outlet and in side-by-side relation to form narrow sinuous flow channels therebetween with the plate corrugations extending transversely to the general direction of gas flow through said flow channels, said separating plates having edge portions in contact with the drum wall at opposite sides of said gas outlet, flow distribution means in contact with said separating plates at the gas outlet end of said flow channels and having restricted openings therein for gas flow therethrough, and support means connected to said drum wall for holding said separator in position.

6. In a horizontally arranged gas and liquid drum constructed to hold a body of liquid in the lower part thereof and having a dry gas outlet in the uppermost part thereof, a gas and liquid separator comprising a plurality of corrugated liquid separating plates symmetrically arranged at opposite sides of said gas outlet in side-by-side relation to form narrow sinuous flow channels therebetween with said corrugations vertically inclined and extending transversely to the general direction of gas flow through said flow channels, the upper edges of said separating plates being curved and in contact with the drum wall, and a curved bottom plate in contact with said separating plates and closing the lower side of said flow channels throughout their extent.

7. In a horizontally arranged gas and liquid drum constructed to hold a body of liquid in the lower part thereof and having a dry gas outlet in the uppermost part thereof, a gas and liquid separator comprising a plurality of corrugated liquid separating plates symmetrically arranged at opposite sides of said gas outlet in side-by-side relation to form narrow sinuous flow channels therebetween with said corrugations vertically inclined and extending transversely to the general direction of gas flow through said flow channels, the upper edges of said separating plates being curved and in contact with the drum wall, a flow distribution plate in substantially continuous contact with the ends of said separating plates at the gas outlet end of said flow channels and having orifices therein for gas flow therethrough, a bottom plate closing the lower side of said flow channels throughout their extent, and support means connecting said bottom plate to said drum wall for holding said separator in position.

8. In a horizontally arranged gas and liquid drum constructed to hold a body of liquid in the lower part thereof and having a dry gas outlet in the uppermost part thereof, a gas and liquid separator comprising a plurality of corrugated liquid separating plates symmetrically arranged at opposite sides of said gas outlet in side-by-side relation to form narrow sinuous flow channels therebetween with said corrugations vertically inclined and extending transversely to the general direction of gas flow through said flow channels, the upper edges of said separating plates being curved and in contact with the drum wall, adjoining corrugated plates being of different lengths and relatively arranged to progressively decrease the width of said flow channels towards the gas outlet end thereof, a flow distribution plate in substantially continuous contact with the ends of said separating plates at the gas outlet end of said flow channels and having orifices therein for gas flow therethrough, a bottom plate closing the lower side of said flow channels throughout their extent, and support means connecting said bottom plate to said drum wall for holding said separator in position.

9. In a horizontally elongated gas and liquid drum constructed to hold a body of liquid in the lower part thereof and having a dry gas outlet in the uppermost part thereof, a gas and liquid separator in said drum comprising a plurality of corrugated liquid separating plates symmetrically arranged relative to said gas outlet in side-by-side relation to form sinuous flow channels therebetween with the plate corrugations extending transversely to the general direction of gas flow through said flow channels, said separating plates being arranged with edge portions in contact with the drum wall, means for supporting said separating plates, and means contacting with edge portions of said separating plates for substantially restricting the gas flow area at the gas outlet end of each of said flow channels.

10. In a horizontally elongated gas and liquid drum constructed to hold a body of liquid in the lower part thereof and having a dry gas outlet in the uppermost part thereof, a gas and liquid separator in said drum comprising a plurality of corrugated liquid separating plates symmetrically arranged relative to and extending across said drum below said gas outlet in side-by-side relation to form narrow flow channels therebetween with the plate corrugations extending transversely to the general direction of gas flow through said flow channels, opposite ends of said separating plates being arranged in contact with the drum wall, and means for supporting said separating plates from said drum wall.

11. In a gas and liquid drum having a dry gas outlet in the uppermost part of a curved wall thereof, a gas and liquid separator in said drum comprising a plurality of corrugated liquid separating plates symmetrically arranged relative to and extending continuously across said drum below said gas outlet in side-by-side relation to form sinuous flow channels therebetween with the plate corrugations extending transversely to the general direction of gas flow through said flow channels, opposite ends of said separating plates being curved and in contact with the drum wall at opposite sides of said gas outlet, and means for supporting said separating plates from said drum wall.

12. In a gas and liquid drum having a dry gas outlet in the uppermost part of a curved wall thereof, a gas and liquid separator in said drum comprising a plurality of corrugated liquid separating plates symmetrically arranged relative to and extending continuously across said drum below said gas outlet in side-by-side relation to form narrow flow channels therebetween with the plate corrugations extending transversely to the general direction of gas flow through said flow channels, the opposite ends of each separating plate being curved and in contact with the drum wall at opposite sides of said gas outlet, and means for restricting the gas outlet end of said flow channels.

13. In a gas and liquid drum having a dry gas outlet in the uppermost part thereof, a gas and liquid separator in said drum comprising a plurality of corrugated liquid separating plates symmetrically arranged relative to and extending across said drum below said gas outlet in side-by-side relation to form sinuous flow channels therebetween with the plate corrugations extending transversely to the general direction of gas flow through said flow channels, opposite ends of said separating plates being arranged in contact with the drum wall, and said separating plates having crimped edge portions for restricting the gas outlet end of said flow channels.

14. In a horizontally elongated gas and liquid drum constructed to hold a body of liquid in the lower part thereof and having a dry gas outlet in the uppermost part thereof, a gas and liquid separator in said drum comprising a plurality of corrugated liquid separating plates symmetrically arranged relative to and extending continuously across said drum below said gas outlet in side-by-side relation to form continuous narrow sinuous flow channels therebetween with the plate corrugations extending transversely to the general direction of gas flow through said flow channels, opposite ends of each of said separating plates being curved and in contact with the drum wall at opposite sides of said gas outlet, means for supporting said separating plates from said drum wall, and means for restricting the gas outlet end of said flow channels.

15. Gas and liquid separating apparatus comprising a plurality of corrugated liquid separating plates arranged side-by-side in spaced relation to form narrow sinuous gas flow channels therebetween with the plate corrugations extending transversely of the general direction of gas flow in said channels, gas flow distribution means contacting with the ends of said separating plates and arranged to close the gas outlet ends of said flow channels except for restricted gas flow openings in said means, and a bottom plate contacting with said separating plates and arranged to close the lower side of said flow channels throughout their extent.

JAMES C. HOBBS.

REFERENCES CITED

The following references are of record in the file of this patent:

UNITED STATES PATENTS

| Number | Name | Date |
|---|---|---|
| 492,082 | Wright | Feb. 21, 1893 |
| 769,440 | Huxley | Sept. 6, 1904 |
| 1,845,750 | Hillery | Feb. 16, 1932 |
| 2,007,966 | Fletcher | July 16, 1935 |
| 2,058,240 | Hobbs | Oct. 20, 1936 |
| 2,256,115 | Hobbs | Sept. 16, 1941 |

FOREIGN PATENTS

| Number | Country | Date |
|---|---|---|
| 194,445 | Germany | Jan. 23, 1908 |
| 360,854 | Germany | Oct. 7, 1922 |